(12) United States Patent
Punithakumar et al.

(10) Patent No.: US 8,478,012 B2
(45) Date of Patent: Jul. 2, 2013

(54) METHODS, APPARATUS AND ARTICLES OF MANUFACTURE TO PROCESS CARDIAC IMAGES TO DETECT HEART MOTION ABNORMALITIES

(75) Inventors: Kumaradevan Punithakumar, London (CA); Shuo Li, London (CA); Ismail Ben Ayed, London (CA); Ian Ross, London (CA); Ali Islam, London (CA); Richard Rankin, London (CA)

(73) Assignee: General Electric Company, Schenectady, NY (US)

( * ) Notice: Subject to any disclaimer, the term of this patent is extended or adjusted under 35 U.S.C. 154(b) by 793 days.

(21) Appl. No.: 12/633,519

(22) Filed: Dec. 8, 2009

(65) Prior Publication Data

US 2011/0064284 A1    Mar. 17, 2011

Related U.S. Application Data

(60) Provisional application No. 61/242,215, filed on Sep. 14, 2009.

(51) Int. Cl.
*G06K 9/36*    (2006.01)

(52) U.S. Cl.
USPC .......................................... 382/131; 382/132

(58) Field of Classification Search
USPC .............. 382/128, 130–132; 378/65; 600/425
See application file for complete search history.

(56) References Cited

U.S. PATENT DOCUMENTS

| | | | |
|---|---|---|---|
| 4,202,340 A | 5/1980 | Langer et al. | |
| 5,797,399 A | 8/1998 | Morris et al. | |
| 5,891,047 A | 4/1999 | Lander et al. | |
| 7,327,862 B2 * | 2/2008 | Murphy et al. | 382/128 |
| 7,471,760 B2 * | 12/2008 | Boese | 378/8 |
| 7,620,447 B2 * | 11/2009 | Harel et al. | 600/510 |
| 7,653,227 B2 * | 1/2010 | Krishnan et al. | 382/128 |
| 7,889,912 B2 * | 2/2011 | Orderud | 382/154 |
| 7,899,222 B2 * | 3/2011 | Rinck et al. | 382/128 |
| 7,957,572 B2 * | 6/2011 | Von Berg et al. | 382/128 |
| 8,009,887 B2 * | 8/2011 | Ionasec et al. | 382/128 |
| 8,009,910 B2 * | 8/2011 | Lotjonen | 382/173 |
| 8,027,430 B2 * | 9/2011 | Nord et al. | 378/65 |
| 8,077,953 B2 * | 12/2011 | Qu et al. | 382/130 |
| 8,094,772 B2 * | 1/2012 | Grass et al. | 378/8 |
| 8,144,930 B2 * | 3/2012 | Li et al. | 382/103 |
| 8,218,845 B2 * | 7/2012 | Lynch et al. | 382/131 |
| 8,271,070 B2 * | 9/2012 | Maier | 600/425 |
| 2005/0209519 A1 | 9/2005 | Krishnan et al. | |

OTHER PUBLICATIONS

Kumaradevan Punithakumar et al., "Heart Motion Abnormality Detection via an Information Measure and Bayesian Fitering," MICCAI 2009, Part II, LNCS 5762, pp. 373-380, 2009.*
U.S. Appl. No. 12/325,226, entitled "Systems and Methods for Tracking Images," and filed on Nov. 30, 2008 (31 pages).
Ben Ayed et al., "Left Ventricle Tracking Using Overlap Priors," Medical Image Computing and Computer-Assisted Intervention—MICCAI 2008, Part I, LNCS 5241, pp. 1025-1033 (9 pages).
Ben Ayed et al., "Embedding Overlap Priors in Variational Left Ventricle Tracking," Jun. 17, 2008 (29 pages).

* cited by examiner

*Primary Examiner* — Allen C. Ho
(74) *Attorney, Agent, or Firm* — Hanley, Flight & Zimmerman, LLC

(57) ABSTRACT

Example methods, apparatus and articles of manufacture to process cardiac images to detect heart motion abnormalities are disclosed. A disclosed example method includes adapting a state of a state-space model based on a plurality of cardiac images to characterize motion of a heart, computing an information-theoretic metric from the state of the state-space model, and comparing the information-theoretic metric to a threshold to determine whether the motion of the heart is abnormal.

19 Claims, 4 Drawing Sheets

METHODS, APPARATUS AND ARTICLES OF MANUFACTURE TO PROCESS CARDIAC IMAGES TO DETECT HEART MOTION ABNORMALITIES

RELATED APPLICATION

This patents claims benefit from U.S. Provisional Patent Application Ser. No. 61/242,215, entitled "Methods, Apparatus and Articles of Manufacture to Detect Heart Motion Abnormalities," and filed Sep. 14, 2009, which is hereby incorporated by reference in its entirety.

FIELD OF THE DISCLOSURE

This disclosure relates generally to cardiac images and, more particularly, to methods, apparatus and articles of manufacture to process cardiac images to detect heart motion abnormalities.

BACKGROUND

A widely used cardiac diagnostic technique involves the imaging of different portions of a heart during various phases of a heartbeat or cardiac cycle to detect or diagnose cardiac disease, abnormalities and/or damage. Example cardiac imaging tools are a magnetic resonance imaging (MRI) system and a computed topography (CT) imaging system.

BRIEF DESCRIPTION OF THE INVENTION

In view of the following descriptions and figures, it should be clear that the present disclosure describes methods, apparatus and articles of manufacture to process cardiac images to detect heart motion abnormalities. Coronary heart disease is the most common type of cardiovascular disease, and early detection of heart motion abnormality(-ies) may be used to diagnose and/or control heart disease. Accordingly, quantitative scoring of heart wall motion may be extremely useful in the clinical environment. However, due to the vast amount of information and uncertainty associated with heart motion, early detection of heart motion abnormalities may be difficult via visual inspection of cardiac images.

The example methods, apparatus and articles of manufacture disclosed herein provide certain advantages over existing heart motion classification methods. For example, the subjective evaluation of heart images by a radiologist can be reduced and/or eliminated, thereby reducing inter and/or intra-observer variability. The examples disclosed herein also enabled automated analysis, which can reduce the time required to obtain a diagnosis and/or begin treatment.

As disclosed herein, left-ventricle heart motion abnormalities may be detected by processing a sequence of cardiac images. The cardiac images may be segmented into one or more regions, and then processed or filtered with a cyclic model such as a recursive Bayesian filter or a Kalman filter. An example segmented region corresponds to the left-ventricular heart cavity. The cyclic model may be adapted and/or adjusted to apply temporal smoothing to the segmented cardiac images of the left-ventricular heart cavity. Such smoothing may be used to reduce the effect of image noise and/or segmentation inaccuracies. States and/or coefficients of the cyclic model may be used to characterize and/or represent the dynamics and/or motion of the segment left-ventricular heart cavity.

Due to statistical similarity between normal and abnormal hearts, the classification and/or discrimination of heart motion based on distribution moments such as the mean systolic velocity may be difficult and/or inaccurate. Instead, an information-theoretic measure or metric of left-ventricle wall motion may be computed from the cyclic model states and/or coefficients. An example information-theoretic metric comprises the Shannon differential entropy (SDE), which provides a global theoretically-grounded measure of statistical distributions and, thus, may be used to accurately discriminate between different types of heart motion. Other example information-theoretic metrics include, but are not limited to, the Rényi entropy and Fisher information. The information-theoretic metric may be compared to decision criteria to determine whether the heart motion depicted in the cardiac images is normal or abnormal.

According to certain aspects of this disclosure, an example method includes adapting a state of a state-space model based on a plurality of cardiac images to characterize motion of a heart, computing an information-theoretic metric from the state of the state-space model, and comparing the information-theoretic metric to a threshold to determine whether the motion of the heart is abnormal.

According to further aspects of this disclosure, an example apparatus includes a motion estimator to adapt a state of a state-space model based on a plurality of cardiac images to characterize motion of a heart, an information metric processor to compute an information-theoretic metric from the state of the state-space model, and a classifier to compare the information-theoretic metric to a threshold to determine whether the motion of the heart is abnormal.

DETAILED DESCRIPTION

In the interest of brevity and clarity, throughout the following disclosure references will be made to an example diagnostic imaging workstation 105. However, the methods, apparatus and articles of manufacture described herein to process cardiac left-ventricle images to detect heart motion abnormalities may be implemented by and/or within any number and/or type(s) of additional and/or alternative diagnostic imaging systems. For example, the methods, apparatus and articles of manufacture described herein could be implemented by or within a device and/or system that captures diagnostic images (e.g., a computed tomography (CT) imaging system and/or magnetic resonance imaging (MRI) system), and/or by or within a system and/or workstation designed for use in viewing, analyzing, storing and/or archiving diagnostic images (e.g., the GE® picture archiving and communication system (PACS), and/or the GE advanced workstation (AW)). Moreover, the example methods, apparatus and articles of manufacture disclosed herein may be used to process any number and/or type(s) of other images, including other types of cardiac images, to detect motion abnormalities.

Figure 1:
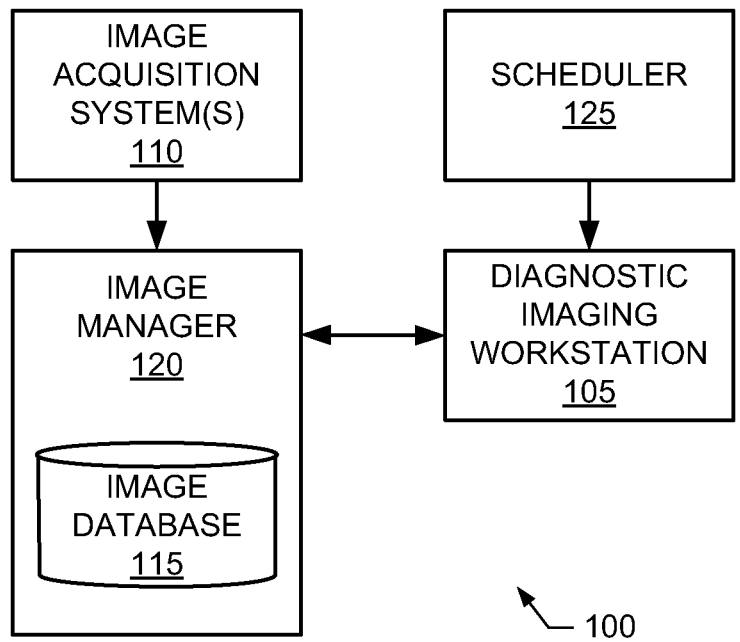
FIG. 1 is a schematic illustration of an example diagnostic imaging system within which the example methods, apparatus and articles of manufacture described herein may be implemented.

FIG. 1 illustrates an example diagnostic imaging system 100 including the example diagnostic imaging workstation 105 to process cardiac left-ventricle images to detect heart motion abnormalities. The cardiac left-ventricle images may be captured by any number and/or type(s) of image acquisition system(s) 110, and stored in any number and/or type(s) of image database(s) 115 managed by any number and/or type(s) of image manager(s) 120. The processing of cardiac left-ventricle images by the example diagnostic imaging workstation 105 may be scheduled by any number and/or type(s) of scheduler(s) 125. Example image acquisition systems 110 include, but are not limited to, a CT imaging system and/or an MRI system. Images may be stored and/or archived in the example image database 115 of FIG. 1 using any number and/or type(s) of data structures, and the example image database 115 may be implemented using any number and/or type(s) of memory(-ies), memory device(s) and/or storage device(s) such as a hard disk drive, a compact disc (CD), a digital versatile disc (DVD), a floppy drive, etc.

Figure 2:
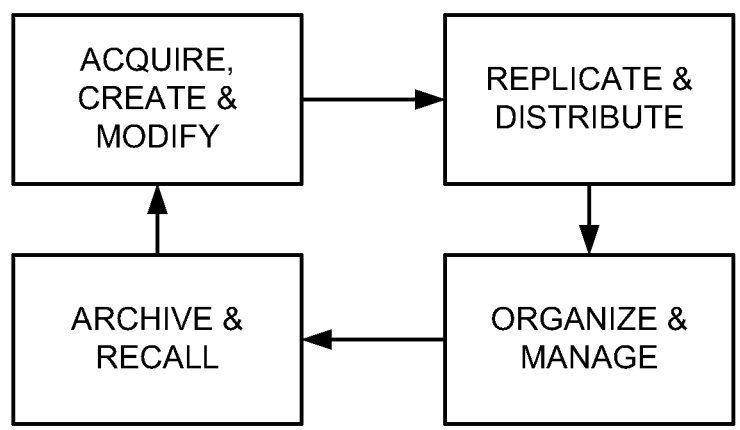
FIG. 2 illustrates an example image lifecycle management flow within which the example methods, apparatus and articles of manufacture described herein may be implemented.

FIG. 2 illustrates an example image lifecycle management flow 200 that may be implemented by the example diagnostic imaging system 100 of FIG. 1. Images (e.g., left-ventricle images) are acquired, created and/or modified by the image acquisition system(s) 110. The image manager(s) 120 replicate, distribute, organize and/or otherwise manage the captured images. The example diagnostic imaging workstation 105 of FIG. 1 processes a sequence of replicated, distributed, organized and/or otherwise managed images to, among other things, detect heart motion abnormalities. Information created, computed and/or otherwise determined during the classification and/or detection of heart motion by the diagnostic imaging workstation 105 can be used to reduce the number of image(s) and/or the amount of data that must be stored, archived and/or otherwise maintained for future recall.

Figure 3:
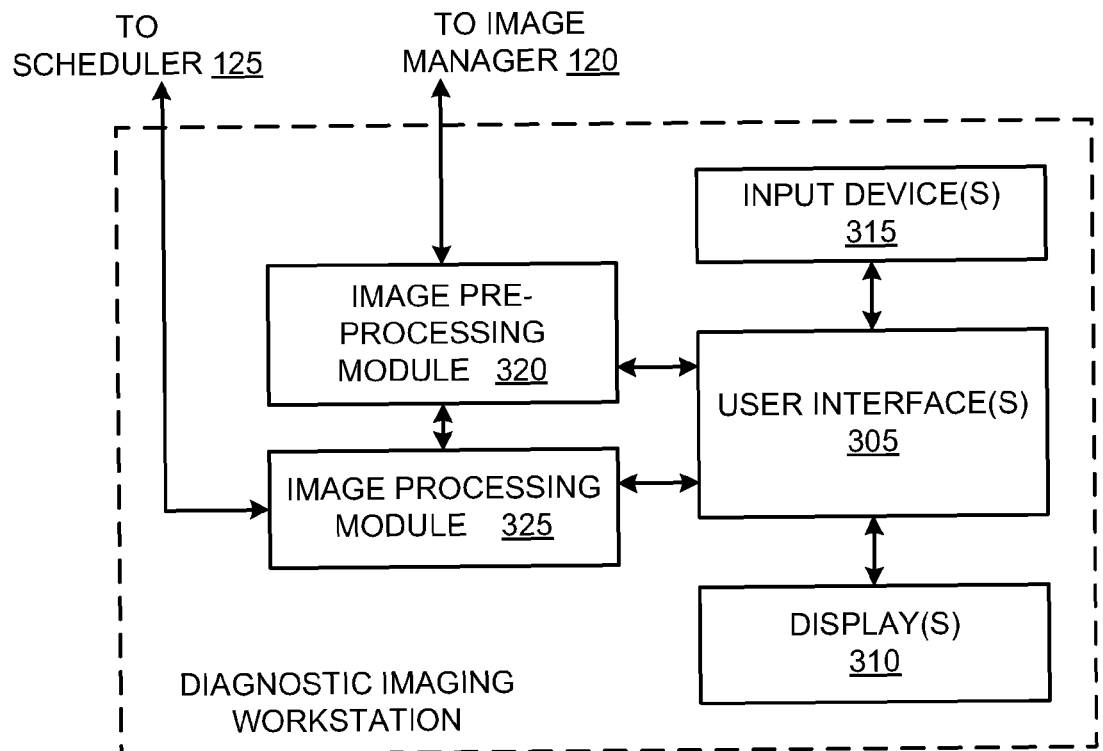
FIG. 3 illustrates an example manner of implementing the example diagnostic workstation of FIG. 1.

FIG. 3 is a schematic illustration of an example diagnostic imaging workstation within which the example methods, apparatus and articles of manufacture to detect heart motion abnormalities described herein may be implemented. To allow a user (not shown) to interact with the example diagnostic imaging workstation 105 of FIG. 3, the diagnostic imaging workstation 105 includes any number and/or type(s) of user interface module(s) 305, any number and/or type(s) of display(s) 310 and any number and/or type(s) of input device(s) 315. The example user interface module(s) 305 of FIG. 3 implements an operating system to present information (e.g., images, windows, screens, interfaces, dialog boxes, etc.) at the display(s) 310, and to allow a user to control, configure and/or operate the example diagnostic imaging workstation 105. The user provides and/or makes inputs and/or selections to the user interface module 305 and/or, more generally, to the example diagnostic imaging workstation 105 via the input device(s) 315. Example input devices 315 include, but are not limited to, a keyboard, a touch screen and/or a mouse. In an example, a patient search window is presented at the display 310, and the input device(s) 315 are used to enter search criteria to identify a particular patient. When a patient is identified and selected, the example user interface 305 presents a list of available diagnostic images for the patient at the display 310, and the user selects one or more sequences of diagnostic images using the input device(s) 315. The user interface 305 then obtains the selected image sequence(s) from the example image manager 120. An image-processing module 325 processes the selected image sequence(s) to determine whether any heart motion abnormalities are present, and presents information related to the presence or absence of heart motion abnormalities at the display 310 for viewing by the user. An example manner of implementing the example image processing module 325 is described below in connection with FIG. 4.

In the illustrated example of FIG. 3, selected image sequence(s) are pre-processed by an image pre-processing module 320 before processing by the example image-processing module. Using any number and/or type(s) of method(s) and/or algorithm(s), the example image pre-processing module 320 of FIG. 3 processes the selected images to detect the boundary of the left-ventricle heart cavity in each selected image. In other words, the example pre-processing module 320 processes the selected images to identify the endocardium in each of the selected images. Example systems and methods for pre-processing images are described in U.S. patent application Ser. No. 12/325,226, now U.S. Pat. No. 8,144,930, filed on Nov. 30, 2008, and entitled "Systems and Methods For Tracking Images," which is hereby incorporated by reference in its entirety.

Let I represent a cardiac sequence containing K frames $I^k: \Omega \subset \Re^2 \to \Re^+$, $k \in [1, \ldots, K]$. The example pre-processing module 320 of FIG. 3 preprocesses the set of images I to detect the boundary of the left-ventricle cavity of the heart (the endocardium) in each frame $k \in [2, \ldots, K]$. The example pre-processing module 320 determines the boundary of the endocardium by evolving a closed planar parametric curve $\vec{\Gamma}^k(s):[0,1] \to \Omega$ toward the endocardium. In some examples, the parametric curve $\vec{\Gamma}^k$ is evolved by minimizing a cost function $F^k$ that includes, among other things, an overlap-prior term or constraint that prevents the papillary muscles of the left-ventricle cavity from being included erroneously in the heart myocardium. However, because the papillary muscles and the myocardium are connected and have almost the same intensity profile their separation may be difficult. Minimization of the cost function $F^k$ results in each frame k being segmented into two regions: the left-ventricle cavity $C^k$ corresponding to the interior of the parametric curve $\vec{\Gamma}^k$ $$C^K = R_{\vec{\Gamma}^k} \qquad (1)$$

where $R_{\vec{\Gamma}}$ denotes the region enclosed by curve $\vec{\Gamma}$, and the background $B^k$ corresponding to the region outside the parametric curve $\vec{\Gamma}^k$ $$B^k = R_{\vec{\Gamma}^k}^c \qquad (2)$$

An example cost functional $F^k$ includes three terms: an overlap-prior term, a mean-matching term and a regularization/gradient term, which are defined as follows.

An example overlap-prior term is defined using the following definitions. $P_{R,I}$ is the nonparametric (kernel-based) estimate of the intensity distribution within region R in frame $I \in \{I^k, k=1, \ldots, K\}$ $$\forall z \in \Re^+, P_{R,I}(z) = \frac{\int_R \aleph(z - I(x)) dx}{a_R} \quad (3)$$

where $a_R$ is the area of region R $$a_R = \int_R dx \quad (4)$$

Example kernels $\aleph(\bullet)$ include, but are not limited to, the Dirac function and the Gaussian kernel. B(f/g) is the Bhattacharyya coefficient representing the amount of overlap between two statistical samples f and g $$B(f/g) = \sum_{z \in \Re^+} \sqrt{f(z)g(z)} \quad (5)$$

In the examples described herein, the values of B are selected from [0,1], where 0 indicates that there is no overlap, and 1 indicates a perfect match.

In some examples, the cavity and myocardium regions in the first frame $I^1$, denoted respectively by $C^1$ and M, are provided by a user of the example diagnostic imaging workstation 105. Based on the example definitions of EQNS (3)-(5), an example cavity/myocardium overlap measure is expressed mathematically as $$B^K = B(P_{C^k,I^k}/P_{M,I^1}) \forall k \in [1, \ldots, K], \quad (6)$$

where $B^k$ represents the amount of overlap between the intensity distribution within the heart cavity region $C^k$ in frame $I^k$ and the myocardium model learned from the first frame $I^1$. In most instances, $B^k$ is approximately constant over the cardiac sequence I. Consequently, the value of $B^1$ estimated from the segmentation of the first frame $I^1$ in the sequence I can be used as an overlap-prior to constrain the tracking of the boundary cavity in the subsequent frames $I^2, \ldots, I^K$. To embed prior information about the overlap between the intensity distribution within the cavity and myocardium, the example image pre-processing module 320 of FIG. 3 minimizes the following constraint for each frame $k \in [2, \ldots, K]$ $$O^k = (B_{in}^k - B_{in}^1)^2, \quad (7)$$

where $O^k$ represents the overlap between the intensity distributions within the cavity and prior myocardium fits $B^1_{in}$.

An example mean-matching term, which represents conformity of an intensity mean computed for the left-ventricle cavity in the current frame $I^k$ to a mean computed for the first frame $I^1$, is defined by the following mathematical expression:

$$M^k = (\mu^k - \mu^1)^2, \quad (8)$$

where $\mu^k$ the estimate of intensity mean within $C^k$ for $k \in [1, \ldots, K]$, which is expressed mathematically as $$\mu^k = \frac{\int_{C^k} I^k dx}{a_{C^k}}. \quad (9)$$

An example regularization/gradient term, which may be used to bias the curve toward a high intensity gradient and/or to enforce curve smoothness, is defined mathematically as $$G^k = \oint_{\vec{\Gamma}^k} (g_k + c) ds, \quad (10)$$

where c is a positive constant and $g_k$ is an edge indicator function, which is defined as $$g_k = \frac{1}{1 + \|\nabla I^k\|^2} \forall k \in [1, \ldots, K]. \quad (11)$$

Based on the example terms defined above in EQNS (3)-(11), an example cost function $F^k$ that may be mimized to identify, compute and/or otherwise determine the parametric curve $\vec{\Gamma}^k$ is defined by $$F^k = \alpha O^k + \beta M^k + \lambda G^k \quad (12)$$
$$= \alpha(B^k - B^1)^2 + \beta(\mu^k - \mu^1)^2 + \lambda \oint_{\vec{\Gamma}^k} (g_k + c) ds$$

where the variables or weights $\alpha$, $\beta$ and $\lambda$, are selected to adjust the relative importance or contribution of the three terms described above in connection with EQNS (3)-(11).

The example image pre-processing module 320 of FIG. 3 solves for the parametric curve $\vec{\Gamma}^k$ by minimizing the example cost function $F^k$ of EQN (12) using, for example, Euler-Lagrange descent minimization. In some examples, the example image pre-processing module 320 embeds the curve $\vec{\Gamma}$ in a one-parameter family of curves: $\vec{\Gamma}(s,t):[0,1] \times \Re^+ \to \Omega$, and solves the partial differential equation $$\frac{\partial \vec{\Gamma}^k(s,t)}{\partial t} = \frac{\partial F^k}{\partial \vec{\Gamma}^k} \quad (13)$$

where $$\frac{\partial F}{\partial \vec{\Gamma}}$$

denotes the functional derivative of F with respect to $\vec{\Gamma}$. The example expression of EQN (13) can be rewritten as:

$$\frac{\partial \vec{\Gamma}^k}{\partial t} = \left\{ \begin{array}{l} \frac{\alpha(B^k - B^1)}{a_{C^k}} (B^k - \sqrt{P_{M,I^1}/P_{C^k,I^K}}) + \\ \frac{2\beta(\mu^k - \mu^1)}{a_{C^k}} (\mu^k - I^k) + \lambda[\nabla g_k \vec{k}^k - (g_k + c)\kappa^k] \end{array} \right\} \vec{k}^k \quad (14)$$

where $\kappa^K$ is the mean curvature function of $\vec{\Gamma}^k$ and $\vec{k}^k$ is the outward unit normal to $\vec{\Gamma}^k$, and assuming that the function $\aleph(\bullet)$ used in the kernel density estimation is the Dirac function. The example image pre-processing module 320 solves and/or converges the example expression of EQN (14) for each frame $I^k$, with the left-ventricle cavity boundary for frame k given by the thus obtained curve $\vec{\Gamma}^k$.

While level-set formalisms are used to derive the example curve evolution method described above, any number and/or type(s) of alternative and/or additional method(s), algorithm(s) and/or formalisms may be used to obtain the curve $\vec{\Gamma}^k$ for each image $I^k$.

While an example manner of implementing the example diagnostic imaging workstation 105 of FIG. 1 has been illustrated in FIG. 3, one or more of the interfaces, data structures, elements, processes and/or devices illustrated in FIG. 3 may be combined, divided, re-arranged, omitted, eliminated and/or implemented in any other way. The example user interface(s) 305, the example display(s) 310, the example input device(s) 315, the example image pre-processing module 320, the example image processing module 325 and/or, more generally, the example diagnostic imaging workstation 105 of FIG. 3 may be implemented by hardware, software, firmware and/or any combination of hardware, software and/or firmware. Thus, for example, any of the example user interface(s) 305, the example display(s) 310, the example input device(s) 315, the example image pre-processing module 320, the example image processing module 325 and/or, more generally, the example diagnostic imaging workstation 105 may be implemented by one or more circuit(s), programmable processor(s), application specific integrated circuit(s) (ASIC(s)), programmable logic device(s) (PLD(s)) and/or field programmable logic device(s) (FPLD(s)), etc. When any apparatus claim of any patent resulting from this provisional application is read to cover a purely software and/or firmware implementation, at least one of the example user interface(s) 305, the example display(s) 310, the example input device(s) 315, the example image pre-processing module 320, the example image processing module 325 and/or, more generally, the example diagnostic imaging workstation 105 are hereby expressly defined to include a tangible computer-readable medium such as a memory, a DVD, a CD, etc. storing the firmware and/or software. Further still, the example diagnostic imaging workstation 105 may include interfaces, data structures, elements, processes and/or devices instead of, or in addition to, those illustrated in FIG. 3 and/or may include more than one of any or all of the illustrated interfaces, data structures, elements, processes and/or devices.

Figure 4:
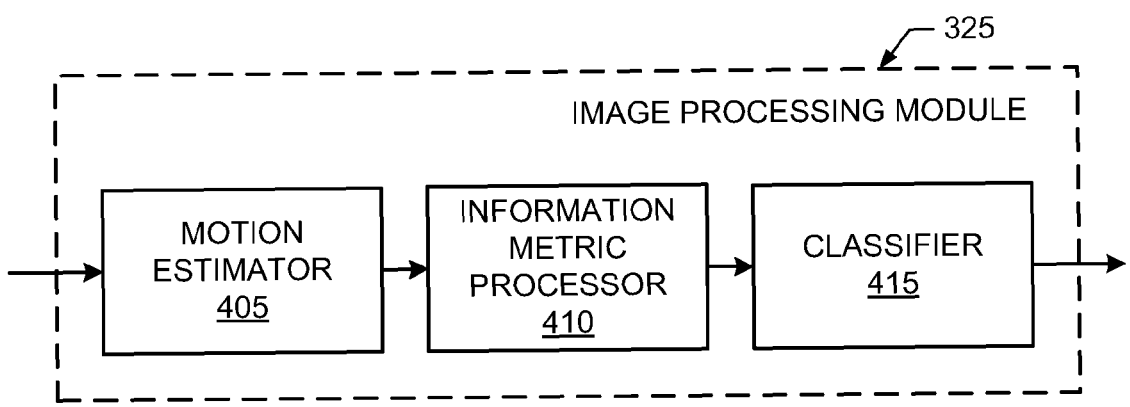
FIG. 4 illustrates an example manner of implementing the example image processing module of FIG. 3.

FIG. 4 illustrates an example manner of implementing the example image processing module 325 of FIG. 3. To compute filter coefficients and/or parameters of a state model that predicts the future position and/or movement of left ventricular cavity points, the example image processing module 325 of FIG. 4 includes a motion estimator 405. The example motion estimator 405 of FIG. 4 predicts left-ventricular cavity points by applying a Bayesian filter, such as the Kalman filter to a sequence of segmented left-ventricle cardiac images.

Let (x, y) be a Cartesian point on the endocardial boundary $\vec{\Gamma}^k(s)$ identified and/or determined by the example image pre-processing module 320, as described above. Let $\xi$ be an example state vector $\xi = [\bar{x}\ x\ \dot{x}]^T$ that represents the dynamics of the point in the x-coordinate direction, where $\dot{x}$ and $\bar{x}$ denote, respectively, the velocity and the mean position of the point over a cardiac cycle or heartbeat. Assuming motion of the heart is substantially periodic, an example continuous state-space model that describes the cyclic motion of the point can be expressed as $$\dot{\xi}(t) = \begin{bmatrix} 0 & 0 & 0 \\ 0 & 0 & 1 \\ \omega^2 & -\omega^2 & 0 \end{bmatrix} \xi(t) + \begin{bmatrix} 1 & 0 \\ 0 & 0 \\ 0 & 1 \end{bmatrix} w(t) = A(t)\xi(t) + Bw(t) \quad (15)$$

where $\omega$ is the angular frequency, and $w(t)$ is white noise that represents the unpredictable modeling errors arising in heart motion detection. The example mathematical model of EQN (15) is linear for a given $\omega$, and is an approximation of a temporal periodic model where higher-order terms of the Fourier expansion are neglected. A substantially equivalent discrete-time version of EQN (15) can be expressed as $$\xi_{k+1} = \begin{bmatrix} 1 & 0 & 0 \\ 1-\cos(\omega T) & \cos(\omega T) & \frac{1}{\omega}\sin(\omega T) \\ \omega\sin(\omega T) & -\omega\sin(\omega T) & \cos(\omega T) \end{bmatrix} \xi_k + w_k \quad (16)$$

$$= F_{cy}(k)\xi_k + w_k$$

where the covariance of the process noise $Q_k = \text{cov}(w_k)$ is given by $$Q_k = \lfloor q_{ij} \rfloor_{3\times 3}, \quad (17)$$

and the $Q_{ij}$'s are defined to be $$q_{11} = q_1^2 T \quad (18)$$

$$q_{12} = q_{21} = \frac{q_1^2(\omega T - \sin(\omega T))}{\omega} \quad (19)$$

$$q_{13} = q_{31} = q_1^2(1 - \cos(\omega T)) \quad (20)$$

$$q_{22} = \frac{1}{2} \cdot \frac{q_1^2 \omega^2 \begin{pmatrix} 3\omega T - 4\sin(\omega T) + \\ \cos(\omega T)\sin(\omega T) \end{pmatrix} + q_2^2 \begin{pmatrix} \omega T - \\ \cos(\omega T)\sin(\omega T) \end{pmatrix}}{\omega^3} \quad (21)$$

$$q_{23} = q_{32} = \frac{1}{2} \cdot \frac{q_1^2 \omega^2 \begin{pmatrix} 1 - 2\cos(\omega T) + \\ \cos^2(\omega T) \end{pmatrix} + q_2^2 \sin^2(\omega T)}{\omega^2} \quad (22)$$

$$q_{33} = -\frac{1}{2} \cdot \frac{q_1^2 \omega^2 (\cos(\omega T)\sin(\omega T) - \omega T) - q_2^2(\cos(\omega T)\sin(\omega T) - \omega T)}{\omega}. \quad (23)$$

Letting s represent an example state vector $s = [\bar{x}\ x\ \dot{x}\ \bar{y}\ y\ \dot{y}]^T$ representing the dynamics of the left-ventricle cavity in the x-y plane, an example discrete state-space model for the motion of the left-ventricle in the x-y plane is given by $$s_{k+1} = \begin{bmatrix} F_{cy}(k) & 0_{3\times 3} \\ 0_{3\times 3} & F_{cy}(k) \end{bmatrix} s_k + v_k = F_k s_k + v_k. \quad (24)$$

Using any number and/or type(s) of algorithm(s) and/or method(s), the example motion estimator 405 of FIG. 4 processes the segmented images from the example image pre-processing module 320 to obtain an estimate of the state vector s. For example, the example motion estimator 405 applies a Bayesian filter such as a Kalman filter, which may be used as a state estimator for linear and/or Gaussian systems, to recursively update an estimate the state vector s. Letting $z_k = [z_{k,x}\ z_{k,y}]^T$ represent an estimate of the point (x, y) on the endocardial boundary $\vec{\Gamma}^k(s)$ for frame $k \in [1, \ldots, K]$, an example measurement equation is given by $$z_k = H_k s_k + v_k \tag{25}$$

where $$H_k = \begin{bmatrix} 0 & 1 & 0 & 0 & 0 & 0 \\ 0 & 0 & 0 & 0 & 1 & 0 \end{bmatrix} \tag{26}$$

and $v_k$ is a zero-mean Gaussian noise sequence with covariance $$R_k = \begin{bmatrix} r & 0 \\ 0 & r \end{bmatrix} \tag{27}$$

The example motion estimator 405 computes a predicted state using the example model of EQN (24) and by taking an expectation conditioned on $z_{1:k} = \{z_1, \ldots, z_k\}$. Letting $m_k = E[s_k]$ be the mean of the state vector, the motion estimator 405 computes the predicted state using the following mathematical expression $$m_{k+1}^- = F_k m_k \tag{28}$$

The corresponding state prediction covariance is given by $$P_{k+1}^- = F_k P_k F_k^T + Q_k \tag{29}$$

The example motion estimator 405 of FIG. 4 computes the measurement residual or innovation by taking the expectation conditioned on $Z_{1:k}$ $$v_{k+1} = z_k - H_k m_{k+1}^- \tag{30}$$

with the corresponding innovation covariance defined by $$S_{k+1} = H_k P_{k+1}^- H_k^T + R_k \tag{31}$$

and the filter gain given by $$W_{k+1} = P_{k+1}^- S_{k+1}^{-1} \tag{32}$$

The motion estimator 405 computes the updated state estimate using the following expression $$m_{k+1} = m_{k+1}^- W_{k+1} v_{+1} \tag{33}$$

The motion estimator 405 computes the updated state covariance using the following mathematical expression $$P_{k+1} = P_{k+1}^- - W_{k+1} S_{k+1} W_{k+1}^T \tag{34}$$

In some examples, the initial state vector $s_1$ may not be know a priori. In such examples, the example motion estimator 405 of FIG. 4 implements a two-point differencing method to initialize position and velocity components of the state vector s. For instance, the motion estimator 405 may compute the initial position and velocity elements in x-coordinate direction using the following equations $$\hat{x}_1 = z_{1,x}, \tag{35}$$

and $$\hat{\dot{x}}_1 = \frac{(z_{2,x} - z_{1,x})}{T}. \tag{36}$$

The mean position $\bar{x}$ over the cardiac cycle may be computed by the motion estimator 405 by taking an expectation over all corresponding measurements:

$$\hat{\bar{x}}_1 = \frac{1}{K} \sum_{k=1}^{K} z_{k,z} \tag{37}$$

The example motion estimator 405 likewise computes the initial state elements in y-coordinate direction, $\hat{y}_1$, $\hat{\dot{y}}_1$, and $\bar{y}_1$ using the measurements $\{z_{k,y}\}$. The motion estimator 405 computes the corresponding initial covariance by computing the following mathematical expression $$P_1 = \begin{bmatrix} \Phi_1 & 0_{3 \times 3} \\ 0_{3 \times 3} & \Phi_1 \end{bmatrix} \tag{38}$$

where $$\Phi_1 = \begin{bmatrix} r & r/K & r/KT \\ r/K & r & r/T \\ r/KT & r/T & 2r/T^2 \end{bmatrix} \tag{39}$$

In some instances, segmentation of the left-ventricle cavity may not be consistent over a cardiac cycle. The example motion estimator 405 of FIG. 4 detects such inconsistencies by gating the center of the segmented left-ventricle cavity. For example, letting $\{s_k^i = [\bar{x}_k^i \ x_k^i \ \dot{x}_k^i \ \bar{y}_k^i \ y_k^i \ \dot{y}_k^i]^T : i = 1, \ldots, N\}$ be a sample point on the left-ventricle boundary in frame k, the center of the left-ventricle cavity ($c_{x,k}$, $c_{y,k}$) may be computed by the motion estimator 405 using the following:

$$c_{x,k} = \frac{1}{N} \sum_{i=1}^{N} x_k^i \tag{40}$$

$$c_{y,k} = \frac{1}{N} \sum_{i=1}^{N} y_k^i.$$

If $\sqrt{(c_{x,k+1} - c_{x,k})^2 + (c_{y,k+1} - c_{y,k})^2} > g$ (where g is a predefined constant), the motion estimator 405 ignores the segmentation results. In such instances, the motion estimator 405 only predicts the sample points using the model of EQN (24) without updating the Kalman filter.

In order to identify a sequence of corresponding points over time, the example motion estimator 405 determines symmetric nearest-neighbor correspondences by sampling a set of equally-spaced points along the left-ventricle boundary. The selected sequence of points may be used to analyze wall motion regionally. For example, using spline interpolation, the motion estimator 405 samples $N_s$, points along the left-ventricle cavity in each frame, and N points are chosen as inputs for the Kalman filter. The motion estimator 405 computes a kernel density estimation based on the Gaussian kernel to obtain the probability density. The motion estimator 405 may normalize the radial distance for each dataset with respect to maximum value, to analyze different long-axis segments, namely, apical, mid and basal, without additional processing.

To characterize the motion of the heart, the example image processing module 325 includes an information metric processor 410. The example information metric processor 410 of FIG. 4 processes the state model and/or filter coefficients computed by the example motion estimator 405 to compute, estimate and/or otherwise determine one or more information-theoretic measures or metrics representative of heart motion. Consistent with industry usage, the terms "information-theoretic metric" and "information-theoretic measures" used herein refer to any values that are computed based on one or more properties of information theory. As is well known, the field of information theory is based on probability theory and statistics, and is concerned with the quantification of information and/or the computation of measures of information. Example information-theoretic metrics are entropy, which is the information in a random variable, and mutual information, which represents the amount of information in common between two random variables. Additional example information-theoretic metrics include, but are not limited to, the Shannon differential entropy (SDE), which provides a global theoretical ground measure of distributions, the Rényi entropy, and/or Fisher information.

The example information metric processor 410 of FIG. 4 computes a normalized radial distance $r_k^i$, which can be expressed mathematically as $$r_k^i = \frac{\sqrt{\left(\hat{x}_k^i - \frac{1}{N}\sum_i \hat{x}_k^i\right)^2 + \left(\hat{y}_k^i - \frac{1}{N}\sum_i \hat{y}_k^i\right)^2}}{\max_i \sqrt{\left(\hat{x}_k^i - \frac{1}{N}\sum_i \hat{x}_k^i\right)^2 + \left(\hat{y}_k^i - \frac{1}{N}\sum_i \hat{y}_k^i\right)^2}} \quad (41)$$

where $\hat{x}_k^i$ and $\hat{x}y_k^i$ are the estimates of $x_k^i$ and $y_k^i$ respectively. The values $\hat{x}_k^i$ and $\hat{y}_k^i$ are computed using the Kalman filter described above. Letting $r \in \Re$ be a random variable, the example information metric processor 410 computes a kernel density estimate of the normalized radial distance using the following equation $$f(r) = \frac{\sum_{i,k} \aleph_\sigma(r_k^i - r)}{NK} \quad (42)$$

where $$\aleph_\sigma(y) = \frac{1}{\sqrt{2\pi\sigma^2}} \exp\left(-\frac{y^2}{2\sigma^2}\right) \quad (43)$$

is the Gaussian kernel.

An example SDE computed by the example information metric processor 410 of FIG. 4 is defined by the following mathematical expression $$S_f = -\int_{r \in \Re} \frac{\sum_{i,k} \aleph_\sigma(r_k^i - r)}{NK} \left(\ln \sum_{i,k} \aleph_\sigma(r_k^i - r) - \ln NK\right) dr \quad (44)$$

Other example information-theoretic metrics that may be computed by the example information metric processor 410 include, but are not limited to, the Rényi entropy $$R_f^\alpha = \frac{1}{1-\alpha} \ln \int_{r \in \Re} \left(\frac{\sum_{i,k} \aleph_\sigma(r_k^i - r)}{NK}\right)^\alpha dr \quad 0 < \alpha < \infty, \alpha \neq 1, \quad (45)$$

and Fisher information $$I_f = 4 \int_{r \in \Re} |\nabla g(r)|^2 dr \quad (46)$$

where $$g(r) = \sqrt{\frac{\sum_{i,k} \aleph_\sigma(r_k^i - r)}{NK}} \quad (47)$$

To classify the motion of the heart, the example image processing module 325 includes a classifier 415. The example classifier 415 of FIG. 4 compares the information-theoretic metrics computed by the information metric processor 410 to one or more thresholds. Based on the comparison(s), the motion of the heart is classified as normal or abnormal.

While an example manner of implementing the example image pre-processing module 325 of FIG. 3 is illustrated in FIG. 4, one or more of the interfaces, data structures, elements, processes and/or devices illustrated in FIG. 4 may be combined, divided, re-arranged, omitted, eliminated and/or implemented in any other way. The example motion estimator 405, the example information metric processor 410, the example classifier 415 and/or, more generally, the example image processing module 325 of FIG. 4 may be implemented by hardware, software, firmware and/or any combination of hardware, software and/or firmware. Thus, for example, any of the example motion estimator 405, the example information metric processor 410, the example classifier 415 and/or, more generally, the example image processing module 325 may be implemented by one or more circuit(s), programmable processor(s), ASIC(s), PLD(s) and/or FPLD(s), etc. Any apparatus claim of any patent resulting from this provisional application is read to cover a purely software and/or firmware implementation, at least one of the example motion estimator 405, the example information metric processor 410, the example classifier 415 and/or, more generally, the example image processing module 325 are hereby expressly defined to include a tangible computer-readable medium such as a memory, a DVD, a CD, etc. storing the firmware and/or software. Further still, the example image processing module 325 may include interfaces, data structures, elements, processes and/or devices instead of, or in addition to, those illustrated in FIG. 4 and/or may include more than one of any or all of the illustrated interfaces, data structures, elements, processes and/or devices.

Figure 5:
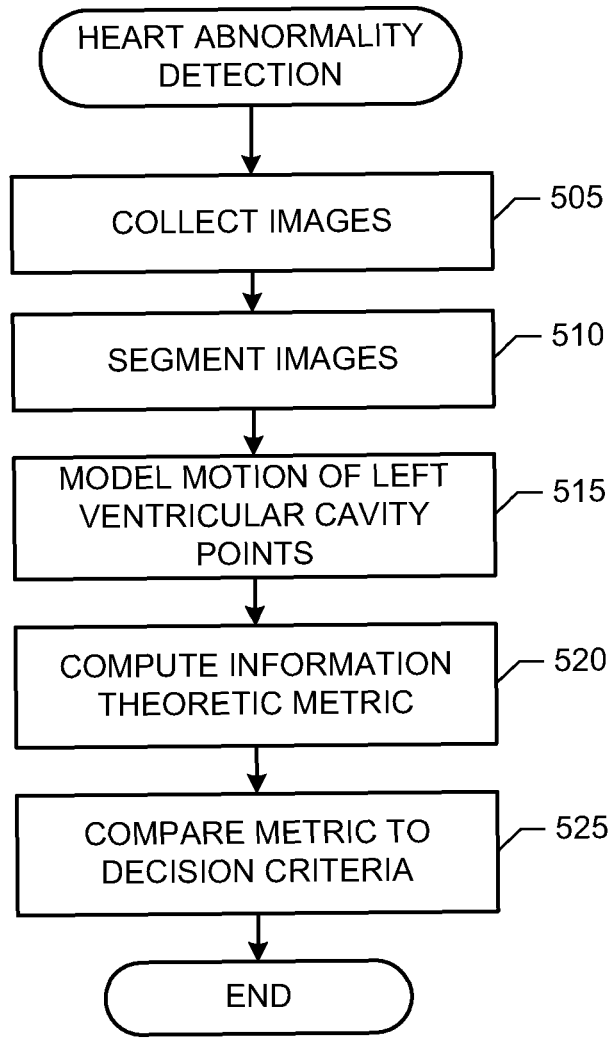
FIG. 5 is a flowchart representative of example process that may be carried out to implement the example diagnostic workstation of FIGS. 1 and 3.

FIG. 5 illustrates an example process that may be carried out to implement the example image processing module 325 and/or, more generally, the example diagnostic workstation 105 of FIGS. 1, 3 and 4. The example process of FIG. 5 may be carried out by a processor, a controller and/or any other suitable processing device. For example, the example process of FIG. 5 may be embodied in coded instructions stored on a tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of computer-executable instructions or data structures, and which can be accessed by a processor, a general purpose or special purpose computer or other machine with a processor (e.g., the example processor platform P100 discussed below in connection with FIG. 6). Combinations of the above are also included within the scope of computer-readable media. Computer-executable instructions comprise, for example, instructions and data that cause a processor, a general purpose computer, special purpose computer, or a special purpose processing machine to perform one or more particular processes. Alternatively, some or all of the example process of FIG. 5 may be implemented using any combination(s) of ASIC(s), PLD(s), FPLD(s), discrete logic, hardware, firmware, etc. Also, some or all of the example process of FIG. 5 may be implemented manually or as any combination of any of the foregoing techniques, for example, any combination of firmware, software, discrete logic and/or hardware. Further, many other methods of implementing the example operations of FIG. 5 may be employed. For example, the order of execution of the blocks may be changed, and/or one or more of the blocks described may be changed, eliminated, sub-divided, or combined. Additionally, any or all of the example process of FIG. 5 may be carried out sequentially and/or carried out in parallel by, for example, separate processing threads, processors, devices, discrete logic, circuits, etc.

The example process of FIG. 5 begins with the example diagnostic imaging workstation 105 collecting a sequence of left-ventricle cardiac images from the example image manager 120 (block 505). The example image pre-processing module 320 segments the images (block 510). The example motion estimator 405 applies a Kalman filter to generate a model and/or filter representative of the motion of the segmented imaged left-ventricle images (block 515). Based on the generated model and/or filters, the example information metric processor 410 computes one or more information-theoretic metrics, such as the SDE, the Rényi entropy, and/or the Fisher information (block 520). Based on the computed information-theoretic metric(s), the example classifier 415 determines whether the motion of the imaged heart is normal or abnormal (block 525). Control then exits from the example process of FIG. 5.

Figure 6:
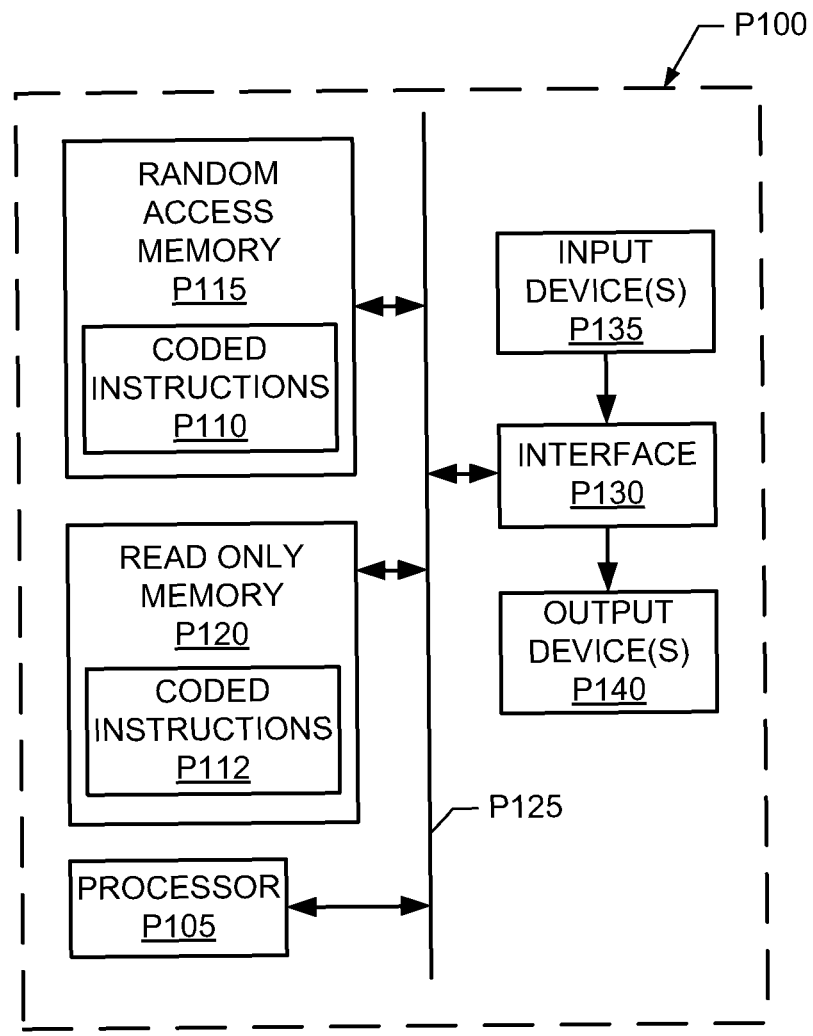
FIG. 6 is a schematic illustration of an example processor platform that may be used and/or programmed to carry out the example process of FIG. 5 and/or to implement any or all of the example methods, apparatus and articles of manufacture described herein.

FIG. 6 is a schematic diagram of an example processor platform P100 that may be used and/or programmed to implement any or all of the example diagnostic imaging workstation 105, the example image pre-processing module 320, the example image processing module 325, the example motion estimator 405, the example information metric processor 410, and/or the example classifier 415 of FIGS. 1, 3 and 4. For example, the processor platform P100 can be implemented by one or more general-purpose processors, processor cores, microcontrollers, etc.

The processor platform P100 of the example of FIG. 6 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIG. 5 to implement the example cardiac left-ventricle image-processing methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example image database 115 of FIG. 1.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 may be used to, for example, implement the example input device(s) 315 of FIG. 3. The example output devices P140 may be used to, for example, implement the example display 310 of FIG. 3.

Generally, computer-executable instructions include routines, programs, objects, components, data structures, etc., that perform particular tasks or implement particular abstract data types. Computer-executable instructions, associated data structures, and program modules represent examples of program code for executing the processes to implement the example methods and systems disclosed herein. The particular sequence of such executable instructions and/or associated data structures represent examples of corresponding acts for implementing the examples described herein.

The example methods and apparatus described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Such network computing environments may encompass many types of computer system configurations, including personal computers, hand-held devices, multi-processor systems, microprocessor-based or programmable consumer electronics, network PCs, minicomputers, mainframe computers, and the like. The example methods and apparatus described herein may, additionally or alternatively, be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
adapting a state of a state-space model based on a plurality of cardiac images to characterize motion of a heart;
computing, via a processor, an information-theoretic metric from the state of the state-space model; and
comparing the information-theoretic metric to a threshold to determine whether the motion of the heart is abnormal.

2. A method as defined in claim 1, wherein the state comprises a plurality of mean positions, a plurality of current positions and a plurality of velocities for respective ones of a plurality of points on the heart.

3. A method as defined in claim 1, wherein the state is adapted by applying at least one of a Bayesian filter or a Kalman filter.

4. A method as defined in claim 1, wherein the information-theoretic metric comprises a Shannon differential entropy.

5. A method as defined in claim 1, wherein the information-theoretic metric comprises a Rényi entropy.

6. A method as defined in claim 1, wherein the information-theoretic metric comprises Fisher information.

7. A method as defined in claim 1, wherein computing the information-theoretic metric comprises:
   computing a kernel density estimate of a normalized radial distance based on the state; and
   computing the information-theoretic metric from the kernel density estimate.

8. A method as defined in claim 1, further comprising segmenting the plurality of cardiac images to form respective ones of a plurality of segmented images, wherein the state of the state-space model is adapted based on the plurality of segmented images.

9. An article of manufacture storing machine-readable instructions that, when executed, cause a machine to:
   adapt a state of a state-space model based on a plurality of cardiac images to characterize motion of a heart;
   compute an information-theoretic metric from the state of the state-space model; and
   compare the information-theoretic metric to a threshold to determine whether the motion of the heart is abnormal.

10. An article of manufacture as defined in claim 9, wherein the machine-readable instructions, when executed, cause the machine to adapt the state by applying at least one of a Bayesian filter or a Kalman filter.

11. An article of manufacture as defined in claim 9, wherein the information-theoretic metric comprises a Shannon differential entropy.

12. An article of manufacture as defined in claim 9, wherein the machine-readable instructions, when executed, cause the machine to:
   segment the plurality of cardiac images to form respective ones of a plurality of segmented images; and
   adapt the state based on the plurality of segmented images.

13. An article of manufacture as defined in claim 9, wherein the machine-readable instructions, when executed, cause the machine to compute the information-theoretic metric by:
   computing a kernel density estimate of a normalized radial distance based on the state; and
   computing the information-theoretic metric from the kernel density estimate.

14. An apparatus comprising:
   a motion estimator to adapt a state of a state-space model based on a plurality of cardiac images to characterize motion of a heart;
   an information metric processor to compute an information-theoretic metric from the state of the state-space model; and
   a classifier to compare the information-theoretic metric to a threshold to determine whether the motion of the heart is abnormal.

15. An apparatus as defined in claim 14, further comprising an imaging device to capture the plurality of cardiac images of the heart.

16. An apparatus as defined in claim 14, further comprising an image pre-processor to segment the plurality of cardiac images to form respective ones of a plurality of segmented images, wherein motion estimator is configured to adapt the state of the state-space model based on the plurality of segmented images.

17. An apparatus as defined in claim 14, wherein the motion estimator comprises at least one of a Bayesian filter or a Kalman filter.

18. An apparatus as defined in claim 14, wherein the information-theoretic metric comprises a Shannon differential entropy.

19. An apparatus as defined in claim 14, wherein the information metric processor is to compute the information-theoretic metric by:
   computing a kernel density estimate of a normalized radial distance based on the state; and
   computing the information-theoretic metric from the kernel density estimate.

* * * * *